US011908160B2

(12) United States Patent
Nie

(10) Patent No.: US 11,908,160 B2
(45) Date of Patent: Feb. 20, 2024

(54) METHOD AND APPARATUS FOR CONTEXT-EMBEDDING AND REGION-BASED OBJECT DETECTION

(71) Applicant: Nokia Technologies Oy, Espoo (FI)

(72) Inventor: Jing Nie, Tianjin (CN)

(73) Assignee: NOKIA TECHNOLOGIES OY, Espoo (FI)

(*) Notice: Subject to any disclaimer, the term of this patent is extended or adjusted under 35 U.S.C. 154(b) by 91 days.

(21) Appl. No.: 17/283,276

(22) PCT Filed: Oct. 12, 2018

(86) PCT No.: PCT/CN2018/110023
§ 371 (c)(1),
(2) Date: Apr. 7, 2021

(87) PCT Pub. No.: WO2020/073310
PCT Pub. Date: Apr. 6, 2020

(65) Prior Publication Data
US 2021/0383166 A1    Dec. 9, 2021

(51) Int. Cl.
*G06V 10/25* (2022.01)
*G06F 18/241* (2023.01)
(Continued)

(52) U.S. Cl.
CPC ............ *G06T 7/73* (2017.01); *G06F 18/2137* (2023.01); *G06F 18/241* (2023.01); *G06V 10/25* (2022.01);
(Continued)

(58) Field of Classification Search
CPC .. G06V 10/454; G06V 10/82; G06V 10/7715; G06V 30/19127; G06V 10/40;
(Continued)

(56) References Cited

U.S. PATENT DOCUMENTS 10,354,159 B2 * 7/2019 Savvides ........... G06F 18/24143
2017/0124415 A1   5/2017 Choi et al.
(Continued)

FOREIGN PATENT DOCUMENTS

CN    106203432 A    12/2016
CN    106339680 A     1/2017
(Continued)

OTHER PUBLICATIONS

Kantorov et al. "Contextlocnet: Context-aware deep network models for weakly supervised localization." European conference on computer vision. Springer, Cham (Year: 2016).*
(Continued)

*Primary Examiner* — Sumati Lefkowitz
*Assistant Examiner* — Michael Adam Shariff
(74) *Attorney, Agent, or Firm* — ALSTON & BIRD LLP

(57) ABSTRACT

A method of detecting an object in an image using a convolutional neural network (CNN) includes generating, based on the image, a plurality of reference feature maps and a corresponding feature pyramid including a plurality of final feature maps; obtaining a proposed region of interest (ROI); generating at least a first context ROI having an area larger than an area of the proposed ROI; assigning the proposed ROI and the first context ROI to a first and second final feature maps having different sizes; extracting, by performing ROI pooling, a first set of features from the first final feature map using the proposed ROI and a second set of features from the second final feature map using the first context ROI; and determining, based on the first and second sets of extracted features, at least one of a location of the object and a class of the object.

17 Claims, 7 Drawing Sheets

(51) Int. Cl.
*G06V 10/82* (2022.01)
*G06V 20/52* (2022.01)
*G06T 7/73* (2017.01)
*G06F 18/2137* (2023.01)
*G06V 10/44* (2022.01)

(52) U.S. Cl.
CPC ............ *G06V 10/454* (2022.01); *G06V 10/82* (2022.01); *G06V 20/52* (2022.01)

(58) Field of Classification Search
CPC ........ G06V 10/25; G06V 10/764; G06N 3/02; G06T 2207/20084; G06T 7/73; G06T 2207/20016; G06T 2207/20104; G06K 9/6251; G06K 9/00523; G06K 9/629; G06K 9/6217; G06K 9/6232; G06K 9/6268; G06K 9/6267
See application file for complete search history.

(56) References Cited

U.S. PATENT DOCUMENTS

| | | | |
|---|---|---|---|
| 2018/0039853 A1* | 2/2018 | Liu | G06V 10/768 |
| 2018/0150956 A1 | 5/2018 | Kao et al. | |
| 2020/0320326 A1* | 10/2020 | Dou | G06T 7/0012 |

FOREIGN PATENT DOCUMENTS

| | | |
|---|---|---|
| JP | 2018-022484 A | 2/2018 |
| WO | 2017/015947 A1 | 2/2017 |
| WO | 2017/079522 A1 | 5/2017 |

OTHER PUBLICATIONS

Lin et al. "Feature pyramid networks for object detection." Proceedings of the IEEE conference on computer vision and pattern recognition, (Year: 2017).*
Liu et al. "Teaching Squeeze-and-Excitation PyramidNet for Imbalanced Image Classification with GAN-based Curriculum Learning," 24th International Conference on Pattern Recognition (ICPR), IEEE (Year: 2018).*
Roy et al. "Recalibrating fully convolutional networks with spatial and channel "squeeze and excitation" blocks." IEEE transactions on medical imaging 38.2 (2018): 540-549 (Year: 2018).*
Kantorov et al. Contextlocnet: Context-aware deep network models for weakly supervised localization. European conference on computer vision. Springer, Cham, 2016 (Year: 2016).*
Lin et al. "Feature pyramid networks for object detection." Proceedings of the IEEE conference on computer vision and pattern recognition, 2017 (Year: 2017).*
Office action received for corresponding Japanese Patent Application No. 2021-520139, dated Jul. 19, 2022, 6 pages of office action and 9 pages of translation available.
Liu et al., "Teaching Squeeze-and-Excitation PyramidNet for Imbalanced Image Classification with GAN-based Curriculum Learning", 24th International Conference on Pattern Recognition (ICPR), Aug. 20-24, 2018, pp. 2444-2449.
Extended European Search Report received for corresponding European Patent Application No. 18936706.3, dated Apr. 7, 2022, 10 pages.
Wu et al., "An Enhanced Feature Pyramid Object Detection Network for Autonomous Driving", Applied Sciences, vol. 9, No. 20, Oct. 16, 2019, pp. 1-15.
Hu et al., "Squeeze-and-Excitation Networks", arXiv, Sep. 5, 2017, pp. 1-11.
He et al., "Deep Residual Learning for Image Recognition", arXiv, Dec. 10, 2015, pp. 1-12.
Cao et al., "Region-based Convolutional Neural Networks forObject Detection in Very High Resolution RemoteSensing Images", 12th International Conference on Natural Computation, Fuzzy Systems and Knowledge Discovery (ICNC-FSKD), Aug. 13-15, 2016, pp. 548-554.
Girshick, "Fast R-CNN", arXiv, Sep. 27, 2015, 9 pages.
Ren et al., "Faster R-CNN: Towards Real-Time Object Detection with Region Proposal Networks", arXiv, Jun. 4, 2015, pp. 1-10.
Cai et al., "A Unified Multi-scale Deep Convolutional Neural Network for Fast Object Detection", arXiv, Jul. 25, 2016, pp. 1-16.
Lin et al., "Feature Pyramid Networks for Object Detection", arXiv, Dec. 9, 2016, 10 pages.
Kong et al., "RON: Reverse Connection with Objectness Prior Networks for Object Detection", arXiv, Jul. 6, 2017, 10 pages.
Liu et al., "SSD: Single Shot MultiBox Detector", arXiv, Dec. 8, 2015, 9 pages.
Lin et al., "Focal Loss for Dense Object Detection", arXiv, Aug. 7, 2017, pp. 1-10.
Gidaris et al., "Object Detection via a Multi-region & Semantic Segmentation-aware CNN Model", arXiv, Sep. 23, 2015, pp. 1-17.
Li et al.., "Object Detection via Aspect Ratio and Context Aware Region-based Convolutional Networks" arXiv, Mar. 22, 2017, 14 pages.
Kantorov et al., "Contextlocnet: Context-aware Deep Network Models for Weakly Supervised Localization", arXiv, Sep. 14, 2016, pp. 1-16.
Bell et al., "Inside-outside Net: Detecting Objects in Context with Skip Pooling and Recurrent Neural Networks", IEEE Conference on Computer Vision and Pattern Recognition (CVPR), Jun. 2016, pp. 2874-2883.
Kuan et al., "Region Average Pooling for Context-aware Object Detection", IEEE International Conference on Image Processing (ICIP), Sep. 17-20, 2017, 5 pages.
Zhang et al., "Context Encoding for Semantic Segmentation", arXiv, Mar. 23, 2018, pp. 1-11.
Fan et al., "Object Detection with Mask-based Feature Encoding", arXiv, Feb. 12, 2018, pp. 1-10.
He et al., "Mask R-CNN", arXiv, Jan. 24, 2018, pp. 1-12.
International Search Report and Written Opinion received for corresponding Patent Cooperation Treaty Application No. PCT/CN2018/110023, dated Jul. 10, 2019, 9 pages.
Decision to Grant for Japanese No. 2021-520139 dated Nov. 8, 2022, 6 pages.
He et al., "Spatial Pyramid Pooling in Deep Convolutional Networks for Visual Recognition", European Conference on Computer Vision 2014, Lecture Notes in Computer Science, vol. 8691, (2014), 16 pages.
Office Action for European Application No. 18936706.3 dated Jun. 23, 2023, 6 pages.

* cited by examiner

METHOD AND APPARATUS FOR CONTEXT-EMBEDDING AND REGION-BASED OBJECT DETECTION

RELATED APPLICATION

This application claims priority to PCT Application No. PCT/CN2018/110023, filed on Oct. 12, 2018, which is incorporated herein by reference in its entirety.

BACKGROUND

1. Field

Various example embodiments relate generally to methods and apparatuses for performing region-based object detection.

2. Related Art

Object detection is a task in the area of computer vision that is aimed at localizing and recognizing object instances with a bounding box. Convolutional neural network (CNN)-based object detection can be utilized in the areas of visual surveillance, Advanced Driver Assistant Systems (ADAS), and human-machine interaction (HMI).

Current object detection frameworks could be grouped into two main streams: the region-based methods and the region-free methods. Examples of region-based detectors are discussed in, for example, Y S. Cao, X. Niu, and Y. Dou "*Region-based convolutional neural networks for object detection in very high resolution remote sensing images,*" In International Conference on Natural Computation. Fuzzy Systems and Knowledge Discovery, 2016; R. Girshick, "*Fast r-cnn,*" Computer Science, 2015; and S. Ren, K. He, R. Girshick, and J. Sun, "*Faster r-cnn: towards real-time object detection with region proposal networks,*" in International Conference on Neural Information Processing Systems, 2015, pp. 91-99. Generally, region-based methods divide the object detection into two steps. In the first step, a region proposal network (RPN) generates high-quality proposals. Then, in the second step, the proposals are further classified and regressed by a region-wise subnet. Generally, the region-free methods detect objects by regular and dense sampling over locations, scales and aspect ratios.

SUMMARY

According to at least some example embodiments, a method of detecting an object in an image using a convolutional neural network (CNN) includes generating, by the CNN, a plurality of reference feature maps based on the image; generating a feature pyramid including a plurality of final feature maps corresponding, respectively, to the plurality of reference feature maps; obtaining a proposed region of interest (ROI); generating at least a first context ROI based on the proposed ROI such that an area of the first context ROI is larger than an area of the proposed ROI; assigning the proposed ROI to a first final feature map from among the plurality of final feature maps; assigning the first context ROI to a second final feature map from among the plurality of final feature maps, a size of the first final feature map being different than a size of the second final feature map; extracting a first set of features from the first final feature map by performing an ROI pooling operation on the first final feature map using the proposed ROI; extracting a second set of features from the second final feature map by performing an ROI pooling operation on the second final feature map using the first context ROI; and determining, based on the first and second sets of extracted features, at least one of a location of the object with respect to the image and a class of the object.

The feature pyramid may be generated based on the plurality of reference feature maps in accordance with a feature pyramid network (FPN) architecture.

The area of the first context ROI may be $2^2$ times the area of the proposed ROI.

The method may further include concatenating the first and second sets of extracted features, wherein the determining includes determining, based on the concatenated sets of extracted features, at least one of a location of the object with respect to the image and a class of the object.

The method may further include applying the concatenated sets of extracted features to a squeeze-and-excitation block (SEB), wherein the at least one of a location of the object with respect to the image and a class of the object is determined based on an output of the SEB.

The method may further include generating a second context ROI based on the proposed ROI such that an area of the second context ROI is larger than an area of the first context ROI; assigning the second context ROI to a third final feature map from among the plurality of final feature maps, a size of the third final feature map being different than the sizes of the first and second final feature maps; and extracting a third set of features from the first final feature map by performing ROI pooling on the first final feature map using the second context ROT, wherein the determining includes determining, based on the first, second and third sets of extracted features, at least one of the location of the object with respect to the image and the class of the object.

The feature pyramid may be generated based on the plurality of reference feature maps in accordance with a feature pyramid network (FPN) architecture.

The area of the first context ROI may be $2^2$ times the area of the proposed ROI, and the area of the second context ROI may be $4^2$ times the area of the area of the proposed ROI.

The method may further include concatenating the first, second and third sets of extracted features, wherein the determining includes determining, based on the concatenated sets of extracted features, at least one of a location of the object with respect to the image and a class of the object.

The method may further include applying the concatenated sets of extracted features to a squeeze-and-excitation block (SEB), wherein the at least one of a location of the object with respect to the image and a class of the object is determined based on an output of the SEB.

According to at least some example embodiments, a computer-readable medium includes program instructions for causing an apparatus to perform at least generating, by a convolutional neural network (CNN), a plurality of reference feature maps based on an image that includes an object; generating a feature pyramid including a plurality of final feature maps corresponding, respectively, to the plurality of reference feature maps; obtaining a proposed region of interest (ROI); generating at least a first context ROT based on the proposed ROI such that an area of the first context ROT is larger than an area of the proposed ROI; assigning the proposed ROT to a first final feature map from among the plurality of final feature maps; assigning the first context ROT to a second final feature map from among the plurality of final feature maps, a size of the first final feature map being different than a size of the second final feature map; extracting a first set of features from the first final feature map by performing an ROT pooling operation on the first final feature map using the proposed ROT; extracting a second set of features from the second final feature map by performing an ROT pooling operation on the second final feature map using the first context ROT; and determining, based on the first and second sets of extracted features, at least one of a location of the object with respect to the image and a class of the object.

The feature pyramid may be generated based on the plurality of reference feature maps in accordance with a feature pyramid network (FPN) architecture.

The area of the first context ROT may be $2^2$ times the area of the proposed ROI.

The computer-readable medium may further include program instructions for causing an apparatus to perform 1t least concatenating the first and second sets of extracted features, wherein the determining includes determining, based on the concatenated sets of extracted features, at least one of a location of the object with respect to the image and a class of the object.

The computer-readable medium of claim 14 may further include program instructions for causing an apparatus to perform at least applying the concatenated sets of extracted features to a squeeze-and-excitation block (SEB), wherein the at least one of a location of the object with respect to the image and a class of the object is determined based on an output of the SEB.

According to at least some example embodiments, an apparatus includes at least one processor; and at least one memory including computer program code, the at least one memory and the computer program code configured to, with the at least one processor, cause the apparatus at least to perform, generating, by a convolutional neural network (CNN), a plurality of reference feature maps based on an image that includes an object; generating a feature pyramid including a plurality of final feature maps corresponding, respectively, to the plurality of reference feature maps; obtaining a proposed region of interest (ROI); generating at least a first context ROI based on the proposed ROI such that an area of the first context ROI is larger than an area of the proposed ROI; assigning the proposed ROI to a first final feature map from among the plurality of final feature maps; assigning the first context ROI to a second final feature map from among the plurality of final feature maps, a size of the first final feature map being different than a size of the second final feature map; extracting a first set of features from the first final feature map by performing an ROI pooling operation on the first final feature map using the proposed ROI; extracting a second set of features from the second final feature map by performing an ROI pooling operation on the second final feature map using the first context ROI; and determining, based on the first and second sets of extracted features, at least one of a location of the object with respect to the image and a class of the object.

The feature pyramid may be generated based on the plurality of reference feature maps in accordance with a feature pyramid network (FPN) architecture.

The area of the first context ROI may be twice the area of the proposed ROI.

The at least one memory and the computer program code may be further configured to, with the at least one processor, cause the apparatus at least to perform concatenating the first and second sets of extracted features, wherein the determining includes determining, based on the concatenated sets of extracted features, at least one of a location of the object with respect to the image and a class of the object.

The at least one memory and the computer program code may be further configured to, with the at least one processor, cause the apparatus at least to perform applying the concatenated sets of extracted features to a squeeze-and-excitation block (SEB), wherein the at least one of a location of the object with respect to the image and a class of the object is determined based on an output of the SEB.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1:
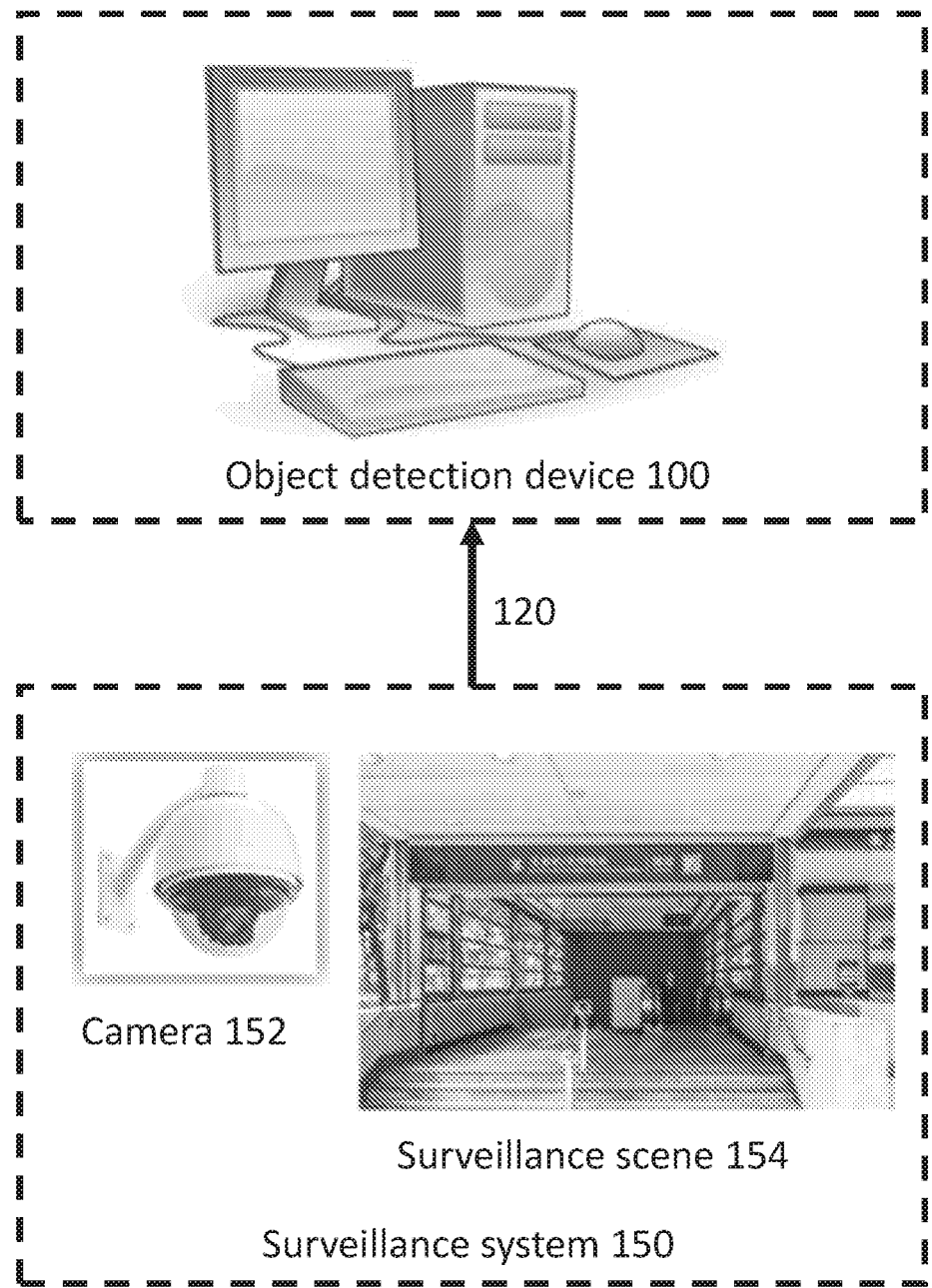
FIG. 1 is a diagram of a surveillance network 10 according to at least some example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Exemplary embodiments are discussed herein as being implemented in a suitable computing environment. Although not required, exemplary embodiments will be described in the general context of computer-executable instructions (e.g., program code), such as program modules or functional processes, being executed by one or more computer processors or CPUs. Generally, program modules or functional processes include routines, programs, objects, components, data structures, etc. that performs particular tasks or implement particular abstract data types.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

I. Overview

As is discussed in greater detail below, a context-embedding, region-based object detection method according to at least some example embodiments is based on region-based object detection methods and includes embedding a context branch in order to obtain rich context information thereby resulting in improved object detection. According to at least some example embodiments, the context information is beneficial for detecting small, blurred and occluded objects. Further, as is also discussed in greater detail below, the context-embedding, region-based object detection method according to at least some example embodiments employs a squeeze-and-excitation block in conjunction with the context branch to reduce or, alternatively, avoid noise information. The context-embedding, region-based object detection method according to at least some example embodiments can be applied in several different ways including, for example, visual surveillance.

Example structures of a surveillance network and object detection device 100 which may utilize the context-embedding, region-based object detection method according to at least some example embodiments will be discussed below in section II of the present disclosure. Next, examples of using feature pyramids and context embedding to perform object detection will be discussed in section III of the present disclosure. Next, examples of a convolutional neural network (CNN) architecture and algorithm for performing the context-embedding, region-based object detection method according to at least some example embodiments will be discussed in section IV of the present disclosure. Further, methods of training the CNN architecture will be discussed in section V of the present disclosure.

II. Example Structures for Implementing the Context-Embedding, Region-Based Object Detection Method According to at Least Some Example Embodiments For example, FIG. 1 illustrates a diagram of a surveillance network 10 according to at least some example embodiments. As is shown in FIG. 1, the surveillance network 10 may include an object detection device 100 and a surveillance system 150.

The surveillance system 150 may include one or more cameras each capturing image data representing a scene in a vicinity of the location of the camera. For example, as is illustrated in FIG. 1, the surveillance system 150 includes the camera 152, which captures surveillance scene 154. The camera 152 may capture surveillance scene 154 by, for example, continuously capturing a plurality of temporally-adjacent images (i.e., capturing video or moving image data) of the surveillance scene 154. According to at least some example embodiments, the camera 152 transmits image data 120 corresponding to the captured surveillance scene 154 to the object detection device 100. An example structure of the object detection device 100 will now be discussed in greater detail below with reference to FIG. 2.

Figure 2:
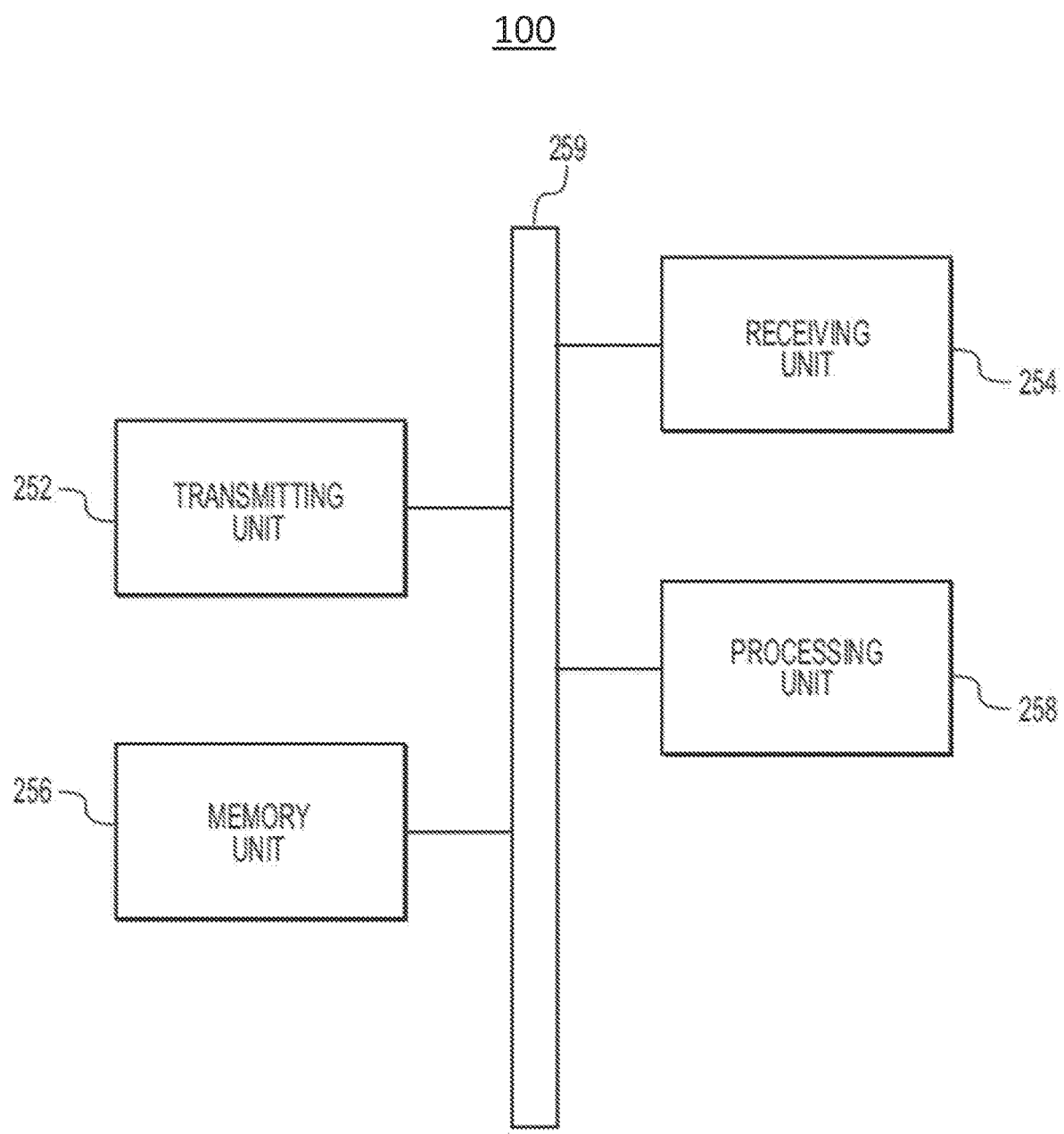
FIG. 2 is a diagram illustrating an example structure of an object detection device according to at least some example embodiments.

FIG. 2 is a diagram illustrating an example structure of the object detection device 100 according to at least some example embodiments.

Referring to FIG. 2, the object detection device 100 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to one or more other network elements in a wireless communications network.

The receiving unit 254 is a device that includes hardware and any necessary software for receiving wireless signals including, for example, control signals or data signals via one or more wired and/or wireless connections to one or more other network elements in a wireless communications network.

The memory unit 256 may be any device capable of storing data including magnetic storage, flash storage, etc. Further, though not illustrated, the memory unit 256 may further include one or more of a port, dock, drive (e.g., optical drive), or opening for receiving and/or mounting removable storage media (e.g., one or more of a USB flash drive, an SD card, an embedded MultiMediaCard (eMMC), a CD, a DVD, and a Blue-ray disc).

The processing unit 258 may be any device capable of processing data including, for example, a processor.

According to at least one example embodiment, any operations described herein, for example with reference to any of FIGS. 1-7, as being performed by a an object detection device may be performed by an electronic device having the structure of the object detection device 100 illustrated in FIG. 2. For example, according to at least one example embodiment, the object detection device 100 may be programmed, in terms of software and/or hardware, to perform any or all of the functions described herein as being performed by an object detection device. Consequently, the object detection device 100 may be embodied as a special purpose computer through software and/or hardware programming.

Examples of the object detection device 100 being programmed, in terms of software, to perform any or all of the functions described herein as being performed by an object detection device will now be discussed below. For example, the memory unit 256 may store a program that includes executable instructions (e.g., program code) corresponding to any or all of the operations described herein as being performed by an object detection device. According to at least one example embodiment, additionally or alternatively to being stored in the memory unit 256, the executable instructions (e.g., program code) may be stored in a computer-readable medium including, for example, an optical disc, flash drive, SD card, etc., and the object detection device 100 may include hardware for reading data stored on the computer readable-medium. Further, the processing unit 258 may be a processor configured to perform any or all of the operations described herein with reference to FIGS. 1-4 as being performed by an object detection device, for example, by reading and executing the executable instructions (e.g., program code) stored in at least one of the memory unit 256 and a computer readable storage medium loaded into hardware included in the object detection device 100 for reading computer-readable mediums.

Examples of the object detection device 100 being programmed, in terms of hardware, to perform any or all of the functions described herein as being performed by an object detection device will now be discussed below. Additionally or alternatively to executable instructions (e.g., program code) corresponding to the functions described with reference to FIGS. 1-7 as being performed by an object detection device being stored in a memory unit or a computer-readable medium as is discussed above, the processing unit 258 may include a circuit (e.g., an integrated circuit) that has a structural design dedicated to performing any or all of the operations described herein with reference to FIGS. 1-6 as being performed by an object detection device. For example, the above-referenced circuit included in the processing unit 258 may be a FPGA or ASIC physically programmed, through specific circuit design, to perform any or all of the operations described with reference to FIGS. 1-7 as being performed by an object detection device.

According to at least some example embodiments, the object detection device 100 performs region-based object detection using context embedding which results improving object detection performance with respect to small, blurred and occluded objects with reference to other object detection methods, while also being able to detect objects at multiple scales. Two features used by some other object detection methods, feature pyramids and embedding context will now be discussed in greater detail below in section III.

III. Feature Pyramids and Embedding Context

For example, some object detection methods utilize feature pyramids, which include feature maps of multiple levels (i.e., multiple scales). For example, the region-based detector, multi-scale CNN (MS-CNN), uses convolutional layers of different spatial resolutions to generate region proposals of different scales. However, the different layers of the MS-CNN detector may have an inconsistent semantic. An example of the MS-CNN is discussed, for example, in Z. Cai and Q. Fan, R. S Feris and N. Vasconcelos, "*A unified multi-scale deep convolutional neural network for fast object detection,*" *European Conference on Computer Vision. Springer, Cham,* 2016.

Figure 3:
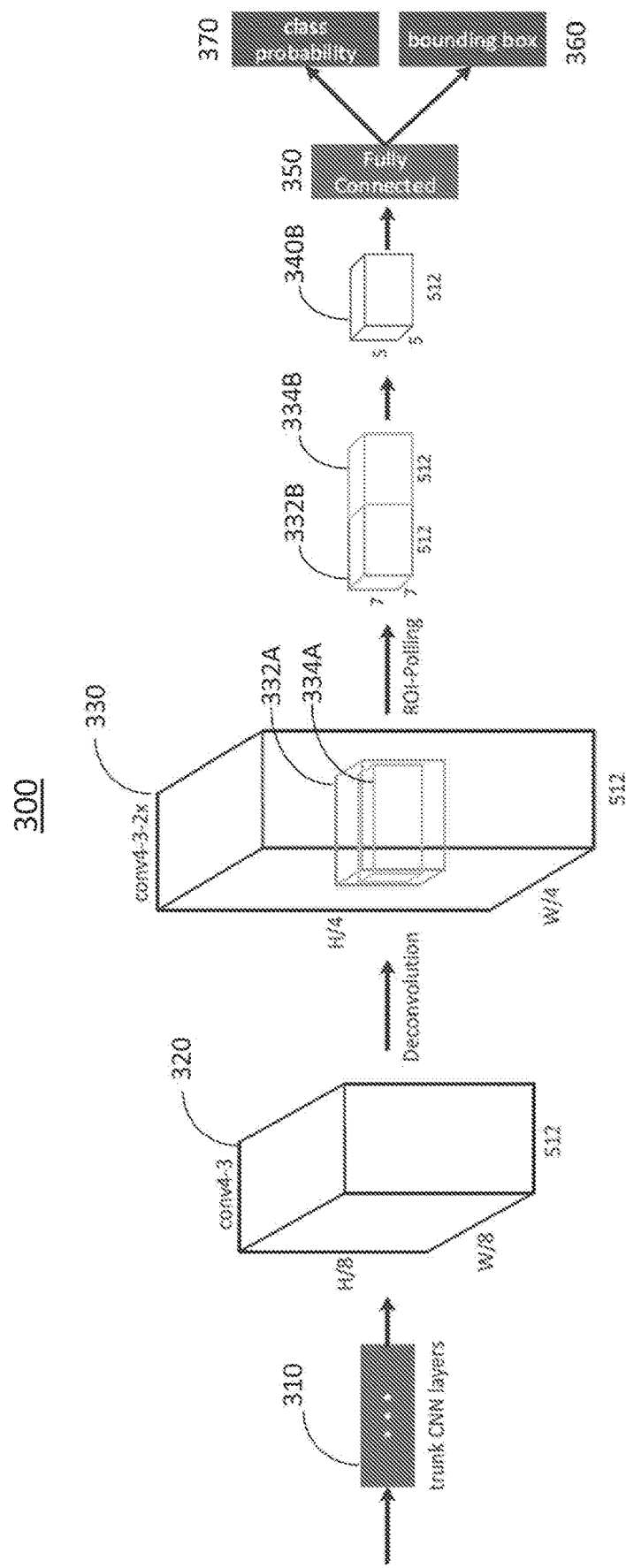
FIG. 3 illustrates an object detection sub-network of a multi-scale convolutional neural network (MS-CNN) detector.

Further, in addition to using feature pyramids to generate region proposals the MS-CNN detector also includes an object detection sub-network that utilizes context embedding. FIG. 3 illustrates an object detection sub-network 300 of an MS-CNN detector. As is illustrated in FIG. 3, the MS-CNN object detection sub-network 300 includes trunk CNN layers 310, a first feature map 320 corresponding to a conv4-3 convolutional layer, and a second feature map 330 corresponding to a conv4-3-2x convolutional layer resulting from performing a deconvolution operation on first feature map 320 such that the second feature map 330 is an enlarged version of the first feature map 320. For the example depicted in FIG. 3, the first feature map 320 has the dimensions H/8×W/8×512, and the second feature map 330 has the dimensions H/4×W/4×512, where H is the height of the input image initially input to the MS-CNN detector and W is the width of the input image.

As is illustrated in FIG. 3, within the second feature map 330, there is a first region 334A (i.e., the innermost cube illustrated within the second feature map 330) and a second region 332A (i.e., the cube illustrated within the second feature map 330 as encompassing the first region 334A). The second region 332A is an enlarged version of the first region 334A and is 1.5 times as large as the first region 334A. Further, as is also illustrated in FIG. 3, features of the second feature map 330 corresponding to a first region 334A are reduced, by ROI pooling, to a first fixed-dimension feature map 334B having the dimensions 7×7×512. Further, features of the second feature map 330 corresponding to a second region 332A are reduced, by ROI pooling, to a second fixed-dimension feature map 332B, which also has the dimensions 7×7×512. As is illustrated in FIG. 3, the MS-CNN object detection sub-network 300 concatenates the first and second fixed-dimension feature maps 334B and 332B, reduces the resulting feature map to a third fixed-dimension feature map 340B having the dimensions 5×5×512, and feeds the features of the third fixed-dimension feature map 340B to a fully connected layer 350 for determination of a class probability 370 and a bounding box 360. By using the enlarged second region 332A in conjunction with the first region 334A, the MS-CNN detector attempts to embed context information of a high level of the feature pyramid included in the MS-CNN detector. However, the richness of the context information corresponding to the enlarged second region 332A may be limited because the enlarged second region 332A and the first region 334A are both mapped to the same level of the feature pyramid (i.e., the conv4-3-2x layer).

In contrast, as is explained below with reference to FIGS. 4-6, a context-embedding, region-based object detection method according to at least some example embodiments disclosed herein includes embedding a context branch such that features corresponding to a proposed region of interest (RoI) and context information corresponding to one or more enlarged RoIs are extracted from multiple levels of the feature pyramid. Consequently, the richness of the extracted context information may be improved relative to context information of the MS-CNN detector, and thus, the object detection performance of the context-embedding, region-based object detection method according to at least some example embodiments may also be improved.

Examples of a convolutional neural network (CNN) architecture and an algorithm for performing the context-embedding, region-based object detection method according to at least some example embodiments will now be discussed in section IV of the present disclosure.

IV. Example CNN Architecture and Algorithm for Implementing the Context-Embedding, Region-Based Object Detection Method According to at Least Some Example Embodiments According to at least some example embodiments, the CNN structures and algorithms discussed below with reference to FIGS. 4-7 may be implemented by the object detection device 100 discussed above with reference to FIGS. 1 and 2. Thus, any or all operations discussed below with reference to FIGS. 4-7 may be executed or controlled by the object detection device 100 (i.e., the processing unit 258).

According to at least some example embodiments, a CNN architecture for implementing the context-embedding, region-based object detection method may include a backbone CNN and a feature pyramid network (FPN) which may be used together to implement one or both of a region proposal network (RPN) and a context-embedding, region-based object detection network.

Figure 4:
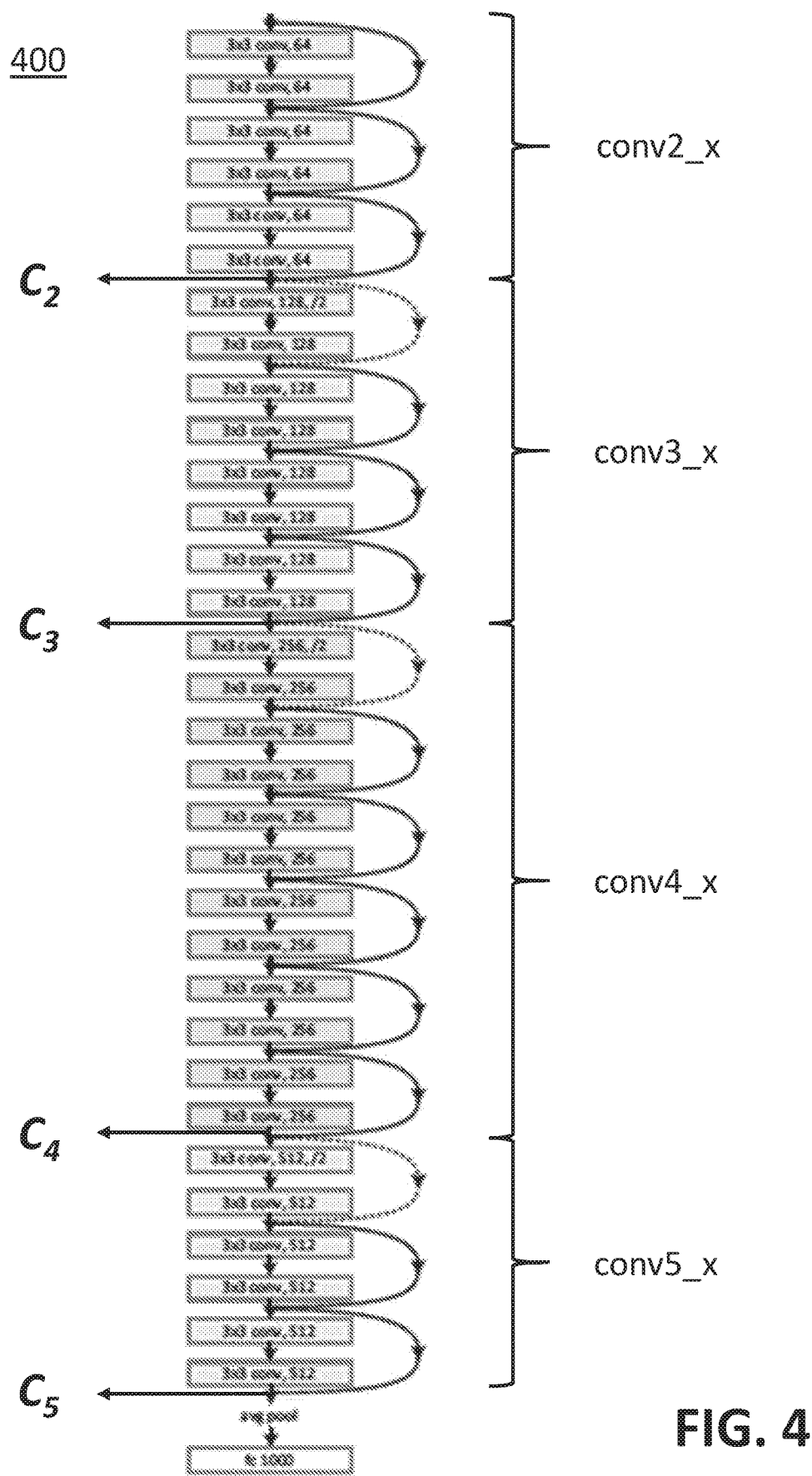
FIG. 4 illustrates a portion of a backbone convolutional neural network (CNN) according to at least some example embodiments.

For example, FIG. 4 illustrates a portion of a backbone CNN 400 according to at least some example embodiments. Further, one type of CNN that may serve as the backbone CNN 400 is the residual network CNN (i.e., ResNet), examples of which (including ResNet36 and ResNet50) are discussed, for example, in K He, X Zhang, S Ren, J Sun, "*Deep Residual Learning for Image Recognition,*" *Proc. IEEE Computer Vision and Pattern Recognition,* 2016. For the purpose of simplicity, the structure of the backbone CNN 400 illustrated in FIG. 4 is the structure of the ResNet36 CNN. However, according to at least some example embodiments, the backbone CNN 400 is implemented by the ResNet50 CNN. Further, the backbone CNN 400 is not limited to the ResNet36 CNN and the ResNet50 CNN. According to at least some example embodiments, the backbone CNN 400 may be implemented by any CNN that generates multiple feature maps having different scales.

As is shown in FIG. 4, when the backbone CNN 400 is implemented by a ResNet, the backbone CNN 400 may include a plurality of convolution layers which output a plurality of reference feature maps, respectively. For example, the backbone CNN 400 illustrated in FIG. 4 includes a first convolutional layer conv1_x (not illustrated), a second convolutional layer conv2_x that outputs a second reference feature map $C_2$, a third convolutional layer conv3_x that outputs a third reference feature map $C_3$, a fourth convolutional layer conv4_x that outputs a fourth reference feature map $C_4$, and a fifth convolutional layer conv5_x that outputs a fifth reference feature map $C_5$. As will be discussed in greater detail below with reference to FIG. 5, the reference feature maps $C_2$, $C_3$, $C_4$, and $C_5$ may form the basis of an FPN.

Figure 5:
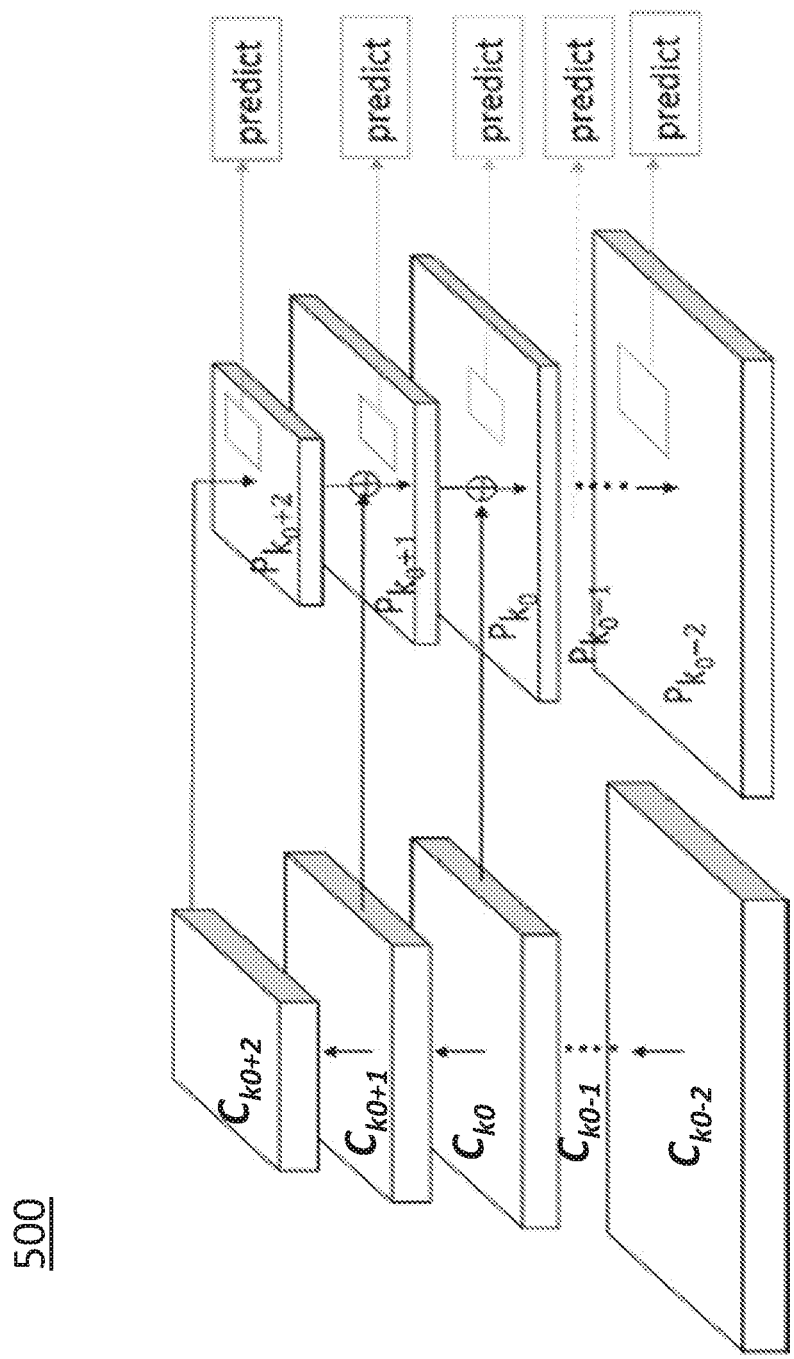
FIG. 5 illustrates a feature pyramid network (FPN) according to at least some example embodiments.

FIG. 5 illustrates an FPN 500 according to at least some example embodiments. The FPN 500 may be constructed based on the reference feature maps (e.g., $2^{nd}$ through fifth reference feature maps $C_2$-$C_5$) of the backbone CNN 400. For example, examples of FPNs are discussed in T. Lin, P. Dollar, R. Girshick, K. He, B. Hariharan, and S. Belongie, "*Feature Pyramid Networks for Object Detection,*" *Proc. IEEE Computer Vision and Pattern Recognition,* 2017; T. Kong, F. Sun, A. Yao, H. Liu, M. Lu, and Y. Chen, "*Ron: Reverse connection with objectness prior networks for object detection,*" *Proc. IEEE Computer Vision and Pattern Recognition,* 2017; and Lin T Y, Goyal P, Girshick R, et al., "*Focal Loss for Dense Object Detection,*" *Proc. IEEE Computer Vision and Pattern Recognition.* In contrast to the multi-scale feature maps of the MS-CNN detector discussed above with reference to FIG. 4, the FPN 500 employs a top-down architecture to create a feature pyramid that includes high-level semantic feature maps at all scales. For example, the FPN 500 creates final feature maps $P_{k0+2}$, $P_{k0+1}$, $P_{k0}$, $P_{k0-1}$, $P_{k0-2}$ corresponding to reference feature maps $C_{k0+2}$, $C_{k0+1}$, $C_{k0}$, $C_{k0-1}$, $C_{k0-2}$, respectively, where $k_0$ is a constant, the value of which may be set, for example, in accordance with the preferences of a designer and/or user of the object detection device 100. The constant $k_0$ will be discussed in greater detail below with reference to equation 1 and FIGS. 6 and 7. Further, as is discussed in greater detail below with reference to FIGS. 6 and 7, the final feature maps P generated by the FPN 500 can be used for one or both of region proposal and context-embedding, region-based object detection.

Figure 6:
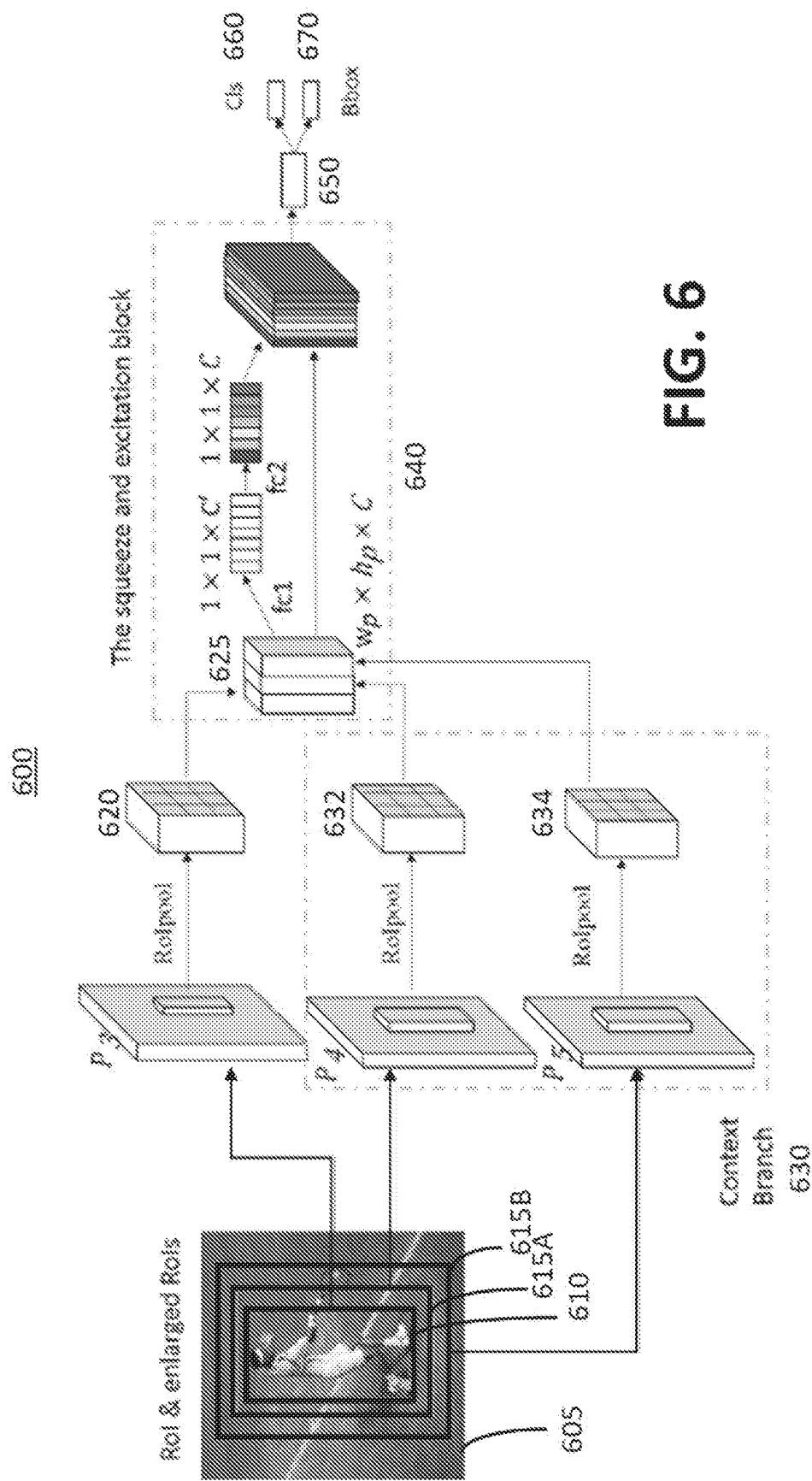
FIG. 6 illustrates a diagram of a portion of a context-embedding, region-based objection detection network 600 according to at least some example embodiments.
Figure 7:
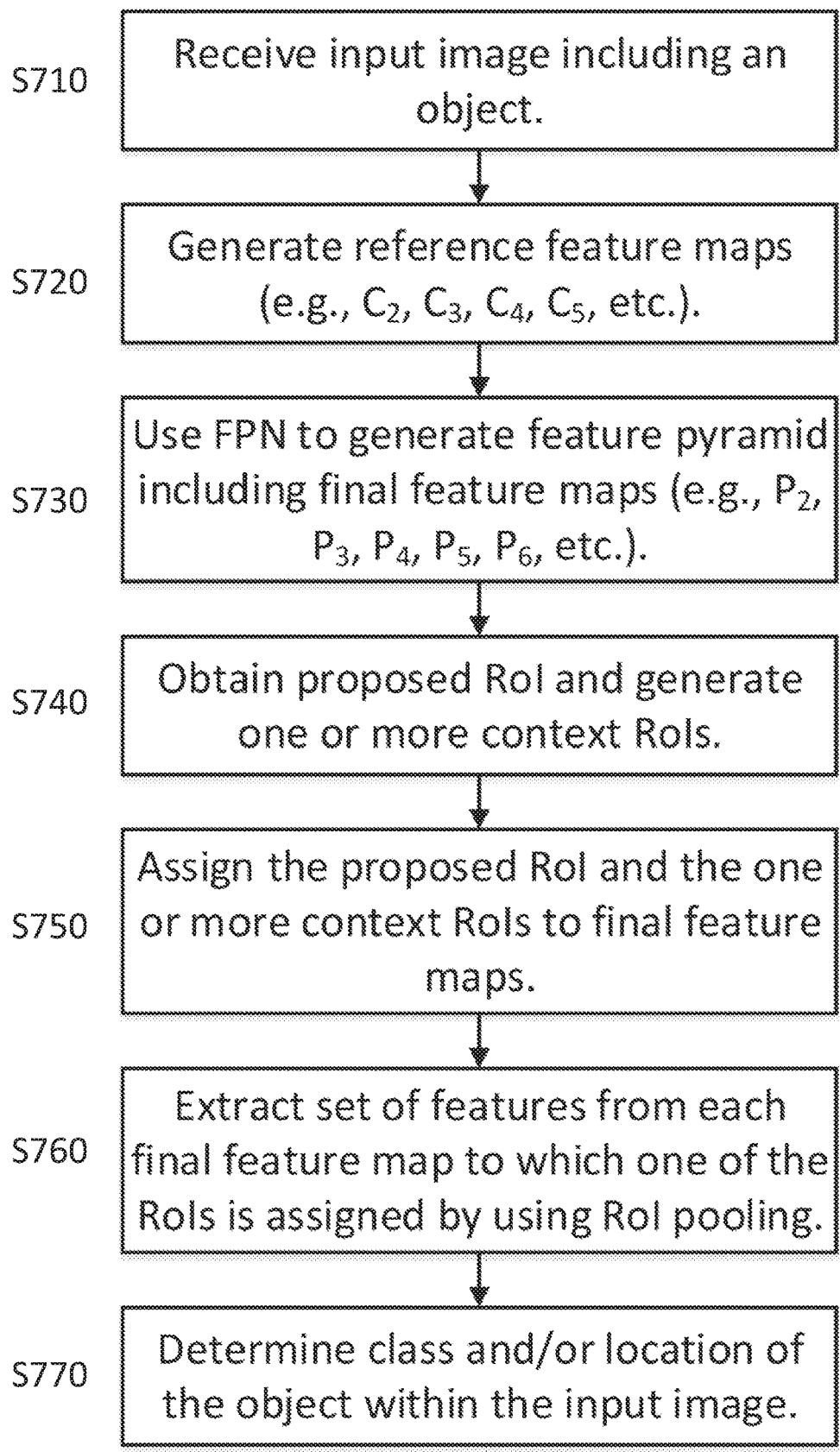
FIG. 7 is a flow chart illustrating an example algorithm for performing the context-embedding, region-based object detection method according to at least some example embodiments.

FIG. 6 illustrates a diagram of a portion of a context-embedding, region-based objection detection network 600 according to at least some example embodiments. FIG. 7 is a flow chart illustrating an example algorithm for performing the context-embedding, region-based object detection method according to at least some example embodiments. An example algorithm for performing the context-embedding, region-based object detection method according to at least some example embodiments will now be discussed with reference to FIGS. 4-7, with respect to an example scenario in which the algorithm is performed by the object detection device 100, and the object detection device 100 implements (i.e., embodies) the backbone CNN 400, FPN 500, and objection detection network 600. Thus, operations described with respect to FIGS. 4-7 as being performed by the backbone CNN 400, FPN 500, or objection detection network 600, or an element thereof; may be performed by the object detection device 100 (e.g., by the processing unit 258 of the object detection device 100 executing computer-readable program code corresponding to the operations of the backbone CNN 400, FPN 500, and objection detection network 600).

Further, for the purpose of simplicity and ease of description, FIG. 7 will be explained with reference to detecting a single object included in an input image. However, the algorithm for performing the context-embedding, region-based object detection method according to at least some example embodiments is not limited to receiving an image including only one object, nor is the algorithm limited to detecting only one object. The input image can include several objects, and the algorithm is capable of detecting several objects of varying classes, locations and scales, concurrently.

Referring to FIG. 7, in step S710, the object detection device 100 receives an input image including an object. According to at least one example embodiment of the inventive concepts, the object detection device 100 may receive the input image as part of image data 120 received from the surveillance system 150, as is discussed above with reference to FIG. 1. After receiving the input image, the object detection device 100 may apply the received image as input to the backbone CNN 400. After step S710, the object detection device 100 proceeds to step S720.

In step S720, the object detection device 100 may generate reference feature maps. For example, the object detection device 100 may generate, using the backbone CNN 400, a plurality of reference feature maps based on the input image received in step S710.

For example, in step S720, the second to fifth convolutional layers {conv2_x, conv3_x, conv4_x, conv5_x} of the backbone CNN 400 may generate the second to fifth reference feature maps {$C_2$, $C_3$, $C_4$, $C_5$}, respectively. The reference feature maps {$C_2$, $C_3$, $C_4$, $C_5$} may each have different sizes/scales which decrease from the second reference feature map $C_2$ to the fifth reference feature map $C_5$. After step S720, the object detection device 100 proceeds to step S730.

In step S730, the object detection device 100 may use an FPN to generate a feature pyramid including final feature maps. For example, the object detection device 100 may generate a feature pyramid including a plurality of final feature maps corresponding, respectively, to the plurality of reference feature maps generated in step S720.

For example, as is discussed above with reference to the FPN 500 illustrated in FIG. 5, in step S720, the FPN 500 may generate first to fifth final feature maps and, optionally, an additional sixth final feature map {$P_2$, $P_3$, $P_4$, $P_5$, $P_6$}. The first to fifth final feature maps {$P_2$, $P_3$, $P_4$, $P_5$} may correspond, respectively, to the first to fifth reference feature maps {$C_2$, $C_3$, $C_4$, $C_5$} generated in step S720. The sixth final feature map $P_6$ may be generated by the FPN 500 based on the fifth final feature map $P_5$, for example, by performing a stride 2 subsampling of the fifth final feature map $P_5$, as is discussed, for example, in T. Lin, P. Dollar, R. Girshick, K. He, B. Hariharan, and S. Belongie, *"Feature Pyramid Networks for Object Detection," Proc. IEEE Computer Vision and Pattern Recognition,* 2017. The final feature maps {$P_2$, $P_3$, $P_4$, $P_5$, $P_6$} may each have different sizes/scales which decrease from the second final feature map $P_2$ to the sixth final feature map $P_6$. After step S730, the object detection device 100 proceeds to step S740.

In step S740, the object detection device 100 obtains a proposed region of interest (RoI or ROI), and generates one or more context RoIs.

For example, according to at least some example embodiments, the object detection device 100 may obtain a proposed RoI from an external source. Alternatively, the object detection device 100 may obtain the proposed RoI by implementing a region proposal network (RPN) based on the FPN 500, and using the FPN-based RPN to generate a proposed RoI.

For example, according to at least some example embodiments, the final feature maps $P_{k0+2}$, $P_{k0+1}$, $P_{k0}$, $P_{k0-1}$, $P_{k0-2}$ generated by the FPN 500 as is illustrated in FIG. 5 can be used to implement the FPN-based RPN. One of ordinary skill in the art will recognize that example methods of implementing an FPN-based RPN are discussed in T. Lin, P. Dollar, R. Girshick, K. He, B. Hariharan, and S. Belongie, *"Feature Pyramid Networks for Object Detection," Proc. IEEE Computer Vision and Pattern Recognition,* 2017. For example, when $k_0=4$, the FPN 500 generates $2^{nd}$ through $6^{th}$ final feature maps $P_2$, $P_3$, $P_4$, $P_5$, and $P_6$. The $6^{th}$ final feature map $P_6$ may be generated based on the $5^{th}$ final feature map $P_5$ in the same manner discussed above with reference to step S730. Further, in order to generate region proposals, the FPN-based RPN may use anchors of three different aspect ratios {1:2, 1:1, 2:1} for each of the second through sixth final feature maps $P_2$-$P_6$ such that the anchors used on the 5 different final feature maps {$P_2$, $P_3$, $P_4$, $P_5$, $P_6$} have 5 different areas {$32^2$, $64^2$, $128^2$, $256^2$, $512^2$}, respectively.

Thus, in step S740, the object detection device 100 may obtain the proposed RoI by either one of receiving the proposed RoI and generating the proposed RoI.

Further, in step S740, based on the obtained proposed RoI, the object detection device 100 may obtain one or more context RoIs by enlarging the proposed RoI. For example, FIG. 6 illustrates an input image 605, a proposed RoI 610, and first and second context RoIs, 615A and 615B. According to at least some example embodiments of the inventive concepts, the object detection network 600 generates the first context RoI 615A by enlarging the area (i.e., w×h) of the proposed RoI 610 by a factor s1 and the object detection network 600 generates the second context RoI 615B by enlarging the area (i.e., w×h) of the proposed RoI 610 by a factor s2, where 'w' is the width of the input image 605, 'h' is the height of the input image 605, and s1 and s2 are both positive numbers greater than 1. In the example illustrated in FIG. 6, $s1=2^2$ and $s2=4^2$. Further, according to at least some example embodiments, the object detection network 600 may determine coordinates for context RoIs, which are generated by enlarging a proposed RoI, in such a manner that the context RoIs are concentric with the proposed RoI.

Further, step S740 is described as obtaining "a proposed RoI" for the purpose of simplicity and ease of description. However, the algorithm for performing the context-embedding, region-based object detection method according to at least some example embodiments is not limited to obtaining just one RoI or just one RoI at a time. For example, the object detection device 100 is capable of obtaining several RoI's of varying locations, scales and aspect ratios, concurrently, in step S740.

Further, though step S740 is described above with reference to an example scenario in which two context RoIs (i.e, two enlarged version of the proposed RoI 610) are generated, according to at least some example embodiments, any number of context RoIs (e.g., 1, 3, 5, etc.) may be generated by enlarging the proposed RoI 610. After step S740, the object detection device 100 proceeds to step S750.

In step S750, the object detection device 100 assigns the proposed RoI and the one or more context RoIs to final feature maps. For example, in step S750, the object detection device may assign the proposed RoI 610, the first context RoI 615A, and the second context RoI 615B to final feature maps, e.g., from among the final feature maps {$P_2$, $P_3$, $P_4$, $P_5$, $P_6$} generated in step S730.

For example, to perform the above-reference assigning, the object detection device 100 may use the following equation:

$$k=\lfloor k_0+\log_2(\sqrt{wh}/224)\rfloor. \quad (1)$$

In Equation 1, 'w' represents width, 'h' represents height, and $k_0$ is a constant, the value of which may be set, for example, in accordance with the preferences of a designer and/or user of the object detection device 100. Additional details for setting $k_0$ are discussed in document [6]. In the example scenario illustrated in FIG. 6, $k_0=4$. It means that $k_0$ is corresponding to the area of $224^2$, (i.e. w×h=$224^2$). Equation 1 is discussed, for example, in T. Lin, P. Dollar, R. Girshick; K He, B. Hariharan, and S Belongie, *"Feature Pyramid Networks for Object Detection," Proc. IEEE Computer Vision and Pattern Recognition,* 2017.

For each of the proposed RoI 610, the first context RoI 615A, and the second context RoI 615B, the object detection device 100 may apply the width 'w' and height 'h' of the RoI to Equation 1, above, to obtain the output k, and assign the RoI to the $k^{th}$ final feature map $P_k$. For example, in the example scenario illustrated in FIG. 6, when the width w and height h of the proposed RoI 610 are applied to Equation 1, k=3. Accordingly, the object detection network 600 assigns the proposed RoI 610 to the $3^{rd}$ final feature map $P_3$, as is illustrated in FIG. 6. Similarly, when the widths w and heights h of the first and second context RoIs 615A and 615B are applied to Equation 1, k=4 and 5, respectively. Accordingly, the object detection network 600 assigns the first and second context RoIs 615A and 615B to the $4^{th}$ and $5^{th}$ final feature maps $P_4$ and $P_5$, respectively, as is illustrated in FIG. 6. After step S750, the object detection device 100 proceeds to step S760.

In step S760, the object detection device 100 extracts a set of features from each final feature map to which one of the RoIs is assigned, using RoI pooling. For example, in step S760, the object detection network 600 embodied by the object detection device 100 may perform RoI pooling with respect to the proposed RoI 610 and the final feature map to which the proposed RoI 610 is assigned. Specifically, with respect to the proposed RoI 610, the object detection network 600 performs RoI pooling on the final feature map to which the proposed RoI 610 is assigned (i.e., the $3^{rd}$ final feature map $P_3$) such that the features of the $3^{rd}$ final feature map $P_3$ which fall within the proposed RoI 610 are pooled, by an RoI pooling operation, to generate a fixed-size original feature map 620. Thus, the fixed-size original feature map 620 is a set of features extracted from the $3^{rd}$ final feature map $P_3$ based on the RoI that was originally proposed, proposed RoI 610.

Further, in step S760, the object detection network 600 forms a context branch 630 by performing RoI pooling on the first context RoI 615A and the second context RoI 615B and the final feature maps to which the first context RoI 615A and the second context RoI 615B are assigned. Specifically, with respect to the first and second context RoIs 615A and 615B, the object detection network 600 performs RoI pooling on the final feature maps to which the first and second context RoIs 615A and 615B are respectively assigned (i.e., the $4^{th}$ and $5^{th}$ final feature maps $P_4$ and $P_5$) such that the features of the $4^{th}$ final feature map $P_4$ which fall within the first context RoI 615A are pooled, by an RoI pooling operation, to generate a first fixed-size context feature map 632, and the features of the $5^{th}$ final feature map $P_5$ which fall within the second context RoI 615B are pooled, by an RoI pooling operation, to generate a second fixed-size context feature map 634. Thus, the first fixed-size context feature map 632 is a set of features extracted from the $4^{th}$ final feature map $P_4$ based on the first context RoI 615A and the second fixed-size context feature map 634 is a set of features extracted from the $5^{th}$ final feature map $P_5$ based on the second context RoI 615B.

According to at least some example embodiments, the RoI pooling operations discussed above with reference to step S750 may be performed by using the operations of the RoI pooling layer discussed in document R. Girshick, "Fast r-cnn," *Computer Science*, 2015. Alternatively, according to at least some example embodiments, the RoI pooling operations discussed above with reference to step S750 may be performed by using the operations of the RoIAlign layer. Examples of the RoIAlign layer are discussed, for example, in K He, G. Gkioxari, P. Dollar, R. Girshick, "*Mask R-CNN*," In *ICCV* 2018. After step S760, the object detection device 100 then proceeds to step S770.

In step S770, the object detection device 100 determines a class and/or location of the object included in the image. For example, in step S770, the object detection network 600 may perform context embedding by concatenating the first and second fixed-size context feature maps 632 and 634 to the fixed-size original feature map 620, thereby forming the concatenated feature map 625, as is shown in FIG. 6.

Further, in contrast the MS-CNN object detection sub-network 300 discussed above with respect to FIG. 3, the object detection network 600 may obtain richer context features and improved object detection results because the features included in the concatenated feature map 625 were not all extracted from the same convolutional layer or the same layer of the feature pyramid $\{P_2, P_3, P_4, P_5, P_6\}$.

As is also shown in FIG. 6, the object detection network 600 includes a squeeze and excitation (SE) block 640 and may apply the concatenated feature map 625 to the SE block 640 in order to reduce or, alternatively, eliminate noise information, for example, by recalibrating channel-wise feature responses. The SE block 640 contains two steps: squeeze and excitation. The first step is to squeeze global spatial information into a channel descriptor. This is achieved by using global average pooling to generate the channel-wise statistics. The second step is adaptive recalibration. For example, the SE block 640 may include a fully connected layer fc1 followed by a rectifier linear unit (ReLU), whose output has the dimensions 1×1×C'. Further, the SE block 640 may include another fully connected layer fc2 followed by a sigmoid, the output of which has the dimensions 1×1×C (where, generally, C'=C/16) and is used to rescale the initial features of the concatenated feature map 625, for example, via channel-wise multiplication, as is shown in FIG. 6. Example structures and methods for constructing and using SE blocks are described, for example, in Hu, Jie, Li Shen, and Gang Sun, "*Squeeze-and-excitation networks*," arXiv:1709.01507, 2017.

Next, a class and bounding box (i.e., location) of the object included in the input image 605 are determined by using the output of the SE block 640 is to generate a class probability values 660 and bounding box values 670. For example, the output of the SE block 640 may be applied to another fully connected layer 650 in order to generate class probability values (or class labels) 660 and bounding box values 670.

Object detection utilizes bounding boxes to accurately locate where objects are and assign the objects correct class labels. When image patches or frames of video are used as the input image in step S710, the class probability values 660 and bounding box values 670 are object detection results of the context-embedding, region-based object detection method discussed above with reference to FIGS. 4-7.

At least some example embodiments of the context-embedding, region-based object detection method discussed above with reference to FIGS. 4-7 can be applied to a wide variety of functions including autonomous driving system and video surveillance, as is discussed above with respect to FIG. 1. For example, referring to FIG. 1, when the camera 152 of the surveillance network 10 is placed at the entrance of a subway station, the object detection device 100 implementing the context-embedding, region-based object detection method discussed above with reference to FIGS. 4-7 can help count the pedestrian flow through the subway. In addition, when the camera 152 of the surveillance network 10 is placed in a market, the object detection device 100 implementing the context-embedding, region-based object detection method according to at least some example embodiments can help count the number of customers in the market thereby enabling an owner or operator of the market to control a number of customers, for example, for safety reasons.

Further, the context-embedding, region-based object detection method according to at least some example embodiments includes enlarging the size of the original RoI (e.g., proposed RoI 610) in order to obtain more context information using the enlarged RoIs (e.g., first and second context RoIs 615A and 615B). Further, the enlarged RoIs are mapped to a different feature map than the original RoIs, thereby boosting the representation power of the context information obtained via the enlarged RoIs. Thus, the obtained context information is beneficial for the task of detecting small and occluded objects in the input image.

Example methods of training a CNN architecture to perform the context-embedding, region-based object detection method discussed above with reference to FIGS. 4-7 will now be discussed below in section V.

V. Example Training Methods

The CNN architecture for performing the context-embedding, region-based object detection method discussed above with reference to FIGS. 4-7 can be trained in accordance with known CNN training techniques, for example, to set the various values of the filters used in the various convolutional layers (e.g., the filters of the first through fifth convolutional layers conv1_$x$-conv5_$x$ of the backbone CNN 400 illustrated in FIG. 4).

To begin the training stage, a proper loss function is designed. For the task of object detection, a multi-task loss function, may be used. An example of a multi-task loss function is discussed, for example, in Lin T Y, Goyal P, Girshick R, et al., "*Focal Loss for Dense Object Detection,*" *Proc. IEEE Computer Vision and Pattern Recognition,* 2017. Further, according to at least some example embodiments, training may be performed by using the Common Object in Context (COCO) train and val-minus-minival data sets as training data. With the technique of back-propagation, the parameters of the above-referenced filters are iteratively updated until convergence by the stochastic gradient descent (SGD) algorithm.

Example embodiments being thus described, it will be obvious that embodiments may be varied in many ways. Such variations are not to be regarded as a departure from example embodiments, and all such modifications are intended to be included within the scope of example embodiments.

What is claimed is:

1. A method of detecting an object in an image using a convolutional neural network (CNN), the method comprising:
    generating, by the CNN, a plurality of reference feature maps based on the image;
    generating a feature pyramid including a plurality of final feature maps corresponding, respectively, to the plurality of reference feature maps, wherein respective ones of the plurality of final feature maps are associated with different levels of the feature pyramid;
    obtaining a proposed region of interest (ROI);
    generating at least a first context ROI based on the proposed ROI such that an area of the first context ROI is larger than an area of the proposed ROI;
    assigning the proposed ROI to a first final feature map, associated with one level of the different levels of the feature pyramid, from among the plurality of final feature maps;
    assigning the first context ROI to a second final feature map, associated with another level of the different levels of the feature pyramid, from among the plurality of final feature maps, a size of the first final feature map being different than a size of the second final feature map;
    extracting a first set of features from the first final feature map associated with the one level of the different levels of the feature pyramid by performing an ROI pooling operation on the first final feature map using the proposed ROI;
    extracting a second set of features from the second final feature map associated with the other level of the different levels of the feature pyramid by performing an ROI pooling operation on the second final feature map using the first context ROI;
    applying a concatenation of the first set of features and the second set of features to a squeeze-and-excitation block (SEB); and
    determining, based on an output of the SEB, one or more probability values associated with a location of the object with respect to the image and a class of the object.

2. The method of claim 1, wherein the feature pyramid is generated based on the plurality of reference feature maps in accordance with a feature pyramid network (FPN) architecture.

3. The method of claim 1, wherein the area of the first context is $2^2$ times the area of the proposed ROI.

4. The method of claim 1,
    wherein the determining includes determining, based on the concatenated sets of extracted features, at least one of the location of the object with respect to the image and the class of the object.

5. The method of claim 1, further comprising:
    generating a second context ROI based on the proposed ROI such that an area of the second context ROI is larger than an area of the first context ROI;
    assigning the second context ROI to a third final feature map from among the plurality of final feature maps, a size of the third final feature map being different than the sizes of the first and second final feature maps; and
    extracting a third set of features from the first final feature map by performing ROI pooling on the first final feature map using the second context ROI,
    wherein the determining includes determining, based on the first, second and third sets of extracted features, at least one of the location of the object with respect to the image and the class of the object.

6. The method of claim 5, wherein the feature pyramid is generated based on the plurality of reference feature maps in accordance with a feature pyramid network (FPN) architecture.

7. The method of claim 5, wherein the area of the first context ROI is $2^2$ times the area of the proposed ROI, and the area of the second context ROI is $4^2$ times the area of the proposed ROI.

8. The method of claim 5, further comprising:
    concatenating the first, second and third sets of extracted features,
    wherein the determining includes determining, based on the concatenated sets of extracted features, at least one of the location of the object with respect to the image and the class of the object.

9. The method of claim 8, further comprising:
    applying the concatenated sets of extracted features to a squeeze-and-excitation block (SEB),
    wherein the location of the object with respect to the image and the class of the object is determined based on an output of the SEB.

10. A non-transitory computer-readable medium comprising program instructions for causing an apparatus to perform at least the following:
- generating, by a convolutional neural network (CNN), a plurality of reference feature maps based on an image that includes an object;
- generating a feature pyramid including a plurality of final feature maps corresponding, respectively, to the plurality of reference feature maps, wherein respective ones of the plurality of final feature maps are associated with different levels of the feature pyramid;
- obtaining a proposed region of interest (ROI);
- generating at least a first context ROI based on the proposed ROI such that an area of the first context ROI is larger than an area of the proposed ROI;
- assigning the proposed ROI to a first final feature map, associated with one level of the different levels of the feature pyramid, from among the plurality of final feature maps;
- assigning the first context ROI to a second final feature map, associated with another level of the different levels of the feature pyramid, from among the plurality of final feature maps, a size of the first final feature map being different than a size of the second final feature map;
- extracting a first set of features from the first final feature map associated with the one level of the different levels of the feature pyramid by performing an ROI pooling operation on the first final feature map using the proposed ROI;
- extracting a second set of features from the second final feature map associated with the other level of the different levels of the feature pyramid by performing an ROI pooling operation on the second final feature map using the first context ROI;
- applying a concatenation of the first set of features and the second set of features to a squeeze-and-excitation block (SEB); and
- determining, based on an output of the SEB, one or more probability values associated with a location of the object with respect to the image and a class of the object.

11. The non-transitory computer-readable medium of claim 10, wherein the feature pyramid is generated based on the plurality of reference feature maps in accordance with a feature pyramid network (FPN) architecture.

12. The non-transitory computer-readable medium of claim 10, wherein the area of the first context ROI is $2^2$ times the area of the proposed ROI.

13. The non-transitory computer-readable medium of claim 10,
wherein the determining includes determining, based on the concatenated sets of extracted features, at least one of the location of the object with respect to the image and the class of the object.

14. An apparatus comprising:
at least one processor; and
at least one memory including computer program code,
the at least one memory and the computer program code configured to, with the at least one processor, cause the apparatus at least to perform:
- generating, by a convolutional neural network (CNN), a plurality of reference feature maps based on an image that includes an object;
- generating a feature pyramid including a plurality of final feature maps corresponding, respectively, to the plurality of reference feature maps, wherein respective ones of the plurality of final feature maps are associated with different levels of the feature pyramid;
- obtaining a proposed region of interest (ROI);
- generating at least a first context ROI based on the proposed ROI such that an area of the first context ROI is larger than an area of the proposed ROI;
- assigning the proposed ROI to a first final feature map, associated with one level of the different levels of the feature pyramid, from among the plurality of final feature maps;
- assigning the first context ROI to a second final feature map, associated with another level of the different levels of the feature pyramid, from among the plurality of final feature maps, a size of the first final feature map being different than a size of the second final feature map;
- extracting a first set of features from the first final feature map associated with the one level of the different levels of the feature pyramid by performing an ROI pooling operation on the first final feature map using the proposed ROI;
- extracting a second set of features from the second final feature map associated with the other level of the different levels of the feature pyramid by performing an ROI pooling operation on the second final feature map using the first context ROI;
- applying a concatenation of the first set of features and the second set of features to a squeeze-and-excitation block (SEB); and
- determining, based on an output of the SEB, one or more probability values associated with a location of the object with respect to the image and a class of the object.

15. The apparatus of claim 14, wherein the feature pyramid is generated based on the plurality of reference feature maps in accordance with a feature pyramid network (FPN) architecture.

16. The apparatus of claim 14, wherein the area of the first context ROI is twice the area of the proposed ROI.

17. The apparatus of claim 14,
wherein the determining includes determining, based on the concatenated sets of extracted features, at least one of the location of the object with respect to the image and the class of the object.

* * * * *

UNITED STATES PATENT AND TRADEMARK OFFICE
CERTIFICATE OF CORRECTION

| | | |
|---|---|---|
| PATENT NO. | : 11,908,160 B2 | Page 1 of 1 |
| APPLICATION NO. | : 17/283276 | |
| DATED | : February 20, 2024 | |
| INVENTOR(S) | : Jing Nie | |

It is certified that error appears in the above-identified patent and that said Letters Patent is hereby corrected as shown below:

On the Title Page

In Column 1, item (87), in PCT Pub. Date, Line 1, delete "Apr. 6, 2020" and insert -- Apr. 16, 2020 --, therefor.

Signed and Sealed this
Twenty-second Day of October, 2024

Katherine Kelly Vidal
*Director of the United States Patent and Trademark Office*